United States Patent

Funato

[11] 4,325,601
[45] Apr. 20, 1982

[54] OPTICAL SCANNING DEVICE

[75] Inventor: Hiroyoshi Funato, Chigasaki, Japan

[73] Assignee: Ricoh Co., Ltd., Tokyo, Japan

[21] Appl. No.: 126,698

[22] Filed: Mar. 3, 1980

[30] Foreign Application Priority Data

Mar. 2, 1979 [JP] Japan .................................. 54-24316

[51] Int. Cl.³ .............................................. G02B 27/17
[52] U.S. Cl. .................................................. 350/3.71
[58] Field of Search ............................ 350/3.71, 3.62

[56] References Cited

U.S. PATENT DOCUMENTS

| 3,953,105 | 4/1976 | Ih ........................................ 350/3.71 |
| 4,235,504 | 11/1980 | Ikeda et al. ......................... 350/3.71 |
| 4,239,326 | 12/1980 | Kramer ............................... 350/3.71 |
| 4,243,293 | 1/1981 | Kramer ............................... 350/6.2 |

*Primary Examiner*—John K. Corbin
*Assistant Examiner*—Bruce Y. Arnold
*Attorney, Agent, or Firm*—Oblon, Fisher, Spivak, McClelland & Maier

[57] ABSTRACT

An optical scanning device shifting an optical spot on the scanning surface by rotating a hologram record medium on which a hologram is recorded, is so improved that, in recording a hologram, the incident angle of the principal ray of an object light and the incident angle of the principal ray of a reference light are so defined as to satisfy a particular condition, whereby even if the hologram record is inclined, the optical spot is not displaced.

7 Claims, 5 Drawing Figures

OPTICAL SCANNING DEVICE

BACKGROUND OF THE INVENTION

This invention relates to an improvement of an optical scanning device in which a hologram record medium is rotated so as to move an optical spot on the scanning surface through diffraction.

In general, an optical scanning device of this type employs a hologram record medium, or a rotary body, on the same circumference of which a plurality of interference fringes formed by interference between spherical waves or by interference between a spherical wave and a plane wave are recorded. While a laser beam is applied to the record medium in a predetermined direction, the record medium is rotated, whereby an optical spot on the scanning surface is displaced through hologram diffraction.

With the optical scanning device, in order to provide the optical spot at a predetermined position in the auxiliary scanning direction, on the scanning surface, it is necessary that the incident angle of the laser beam with respect to the hologram surfaces of the hologram record medium is maintained unchanged at all times. In this case, the light source causes no problem because it is fixed. However, the hologram record medium is liable to swing with respect to its rotary axis because its construction is of a rotary mechanism. Therefore, the hologram record medium may cause a problem in that the incident angle of the irradiating beam with respect to the hologram surface may become deviated and shift the position of the optical spot in the auxiliary scanning direction.

The following technical concept is known in the art as disclosed by Japanese Patent Laid-Open No. 15155/1978. In the prior art, when the hologram surface is inclined around the vicinity of the incident position of a beam applied thereto, the condition that the angle of the diffraction beam is maintained unchanged is obtained by analysis. According to the condition thus obtained, the angle of the irradiating beam with respect to the hologram surface is made equal to the angle of the diffraction beam, so that even if the hologram surface is inclined, the angle of the diffraction beam reproduced is maintained unchanged.

However, where the prior art is applied to the abovedescribed optical scanning device, the following difficulties occur: In this case, the inclination of the hologram surface is not relative the hologram surface itself but to the rotary shaft of the hologram record medium. Accordingly, the above-described condition cannot be satisfied, and the shift of the scanning beam position due to the inclination of the hologram record medium cannot be prevented at all.

This will be described with reference to FIG. 1. It is assumed that a conical hologram record medium 1 is inclined by $\Delta\theta$ with respect to the rotary shaft 2 thereof. In this case, the hologram surface is also inclined by $\Delta\theta$, and at the same time a position O where the principal ray of an object light is recorded is shifted to a point O'. If, in this case, the hologram is so set that, as in the prior art, the incident angle of the irradiating beam is equal to the angle of the diffraction beam (the incident angle of an object light and the incident angle of a reference light in recording a hologram being equal to each other and being on both sides of a normal to the exposure surface), then even if the hologram surface is inclined by $\Delta\theta$, the angle of the principal ray diffracted by the inclination is maintained unchanged, and therefore lines PO and P'O are in parallel with each other. As a result, the scanning optical spot is shifted from the position P to the position P'.

As is clear from the above description, if the hologram record medium is inclined with respect to its rotary shaft by mechanical vibration or the like, then the optical spot is displaced in the auxiliary scanning direction, with the result that the scanning line pitch is irregular.

SUMMARY OF THE INVENTION

In view of the foregoing, an object of this invention is to provide a novel optical scanning device in which hologram recording is effected so that even if the hologram record medium is inclined with respect to its rotary shaft, the scanning optical spot is not displaced.

The foregoing object and other objects of the invention have been achieved by the provision of an optical scanning device in which a hologram recording medium is rotated while a reproducing light beam is being applied to the hologram surface of a hologram record medium on the same circumference of which a hologram is continuously recorded; in which, according to the invention, the incident angle $\alpha$ of the principal ray of an object light with respect to a photosensitive member and the incident angle $\beta$ of the principal ray of a reference light with respect to the photosensitive member are set so as to satisfy the following equation, so that even if the hologram record medium is inclined with respect to the rotary shaft thereof, the optical spot is not shifted:

$$\cos \beta = \cos \alpha (1 + r/f \cos^2 \alpha)$$

where r is the distance between the central axis of the rotary shaft of the hologram record medium and the hologram surface, and f is the distance between the scanning surface and the hologram surface.

The nature, principle and utility of the invention will become more apparent from the following detailed description when read in conjunction with the accompanying drawings.

DETAILED DESCRIPTION OF THE INVENTION

Figure 1:
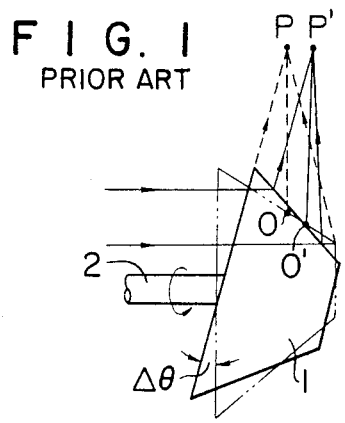
FIG. 1 is an explanatory diagram showing the displacement of a scanning optical spot caused by the inclination of a hologram record medium in a conventional optical scanning device.
Figure 2:
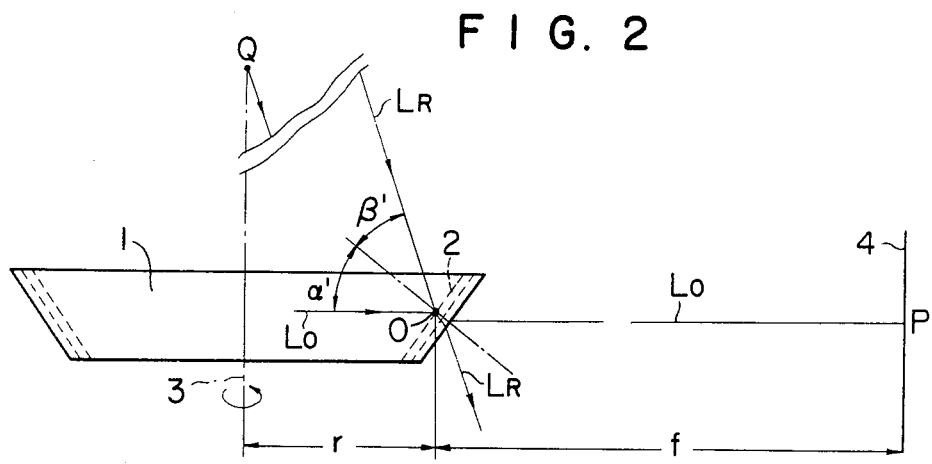
FIG. 2 is an explanatory diagram showing the arrangement of one example of an optical scanning device according to the invention, which is recording a hologram.

FIG. 2 shows the arrangement of one example of an optical scanning device according to this invention, which is recording a hologram on a hologram record medium.

In FIG. 2, reference numeral 1 designates a rotary body which is transparent, hollow and conical, and reference numeral 3 designates the rotary shaft of the rotary body 1. The inside (or outside) of the rotary body 1 is coated with a photosensitive member 2. An object light $L_O$ and a reference light $L_R$ are simultaneously applied in such a manner that the principal rays form predetermined angles $\alpha'$ and $\beta'$ with respect to a normal, at the same point O, to the inner wall of the rotary body 1, to conduct hologram recording. In this case, the object light $L_O$ is a spherical wave which converges at the central point P on a scanning surface 4, and the reference light $L_R$ is a spherical wave which is emitted from one point Q on the rotary axis of the rotary object 1. In FIG. 2, the object light $L_O$ and the reference light $L_R$ are indicated by their principal rays only.

Figure 3:
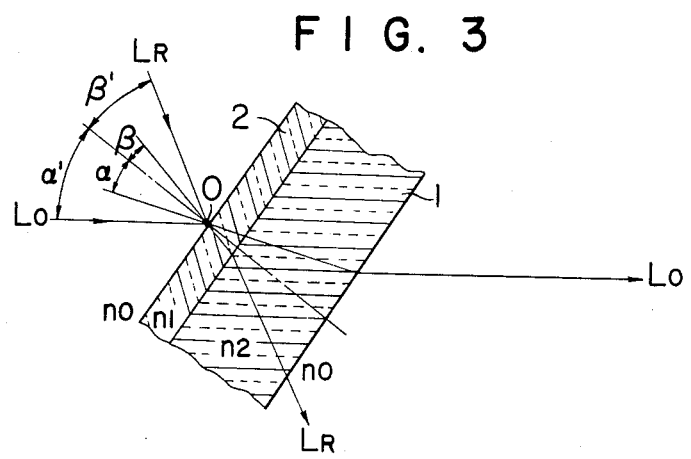
FIG. 3 is an enlarged view showing a part of a hologram record medium.
Figure 4:
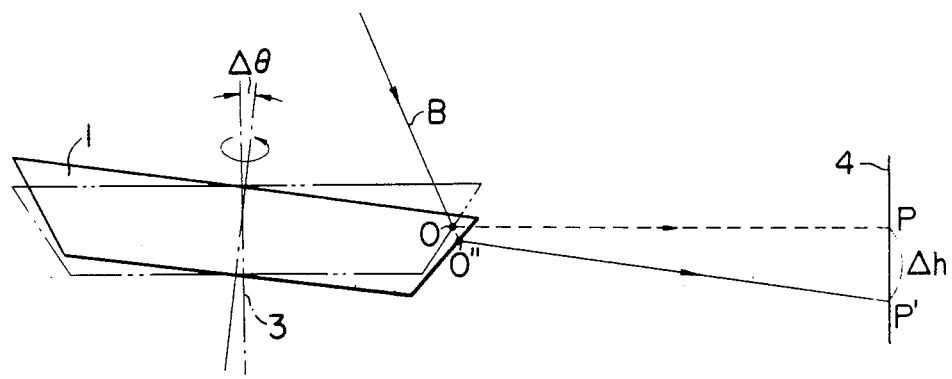
FIG. 4 is an explanatory diagram showing the shift of a scanning optical spot which is caused by the inclination of the hologram record medium during the optical scanning operation of the device arranged as shown in FIG. 2.

FIG. 3 is an enlarged view of a part of the rotary body (FIG. 2) where a hologram is recorded. In FIG. 3, reference character $n_0$ designates the refractive index in air; $n_1$, the refractive index of the photosensitive member 2; and $n_2$, the refractive index of the rotary body 1. The refraction angles $\alpha$ and $\beta$ of the principal rays of the object light $L_O$ and the reference light $L_R$ in the photosensitive member 2 are represented by the following equations (1) and (2), respectively:

$$\alpha = \sin^{-1}((n_0/n_1)\sin\alpha') \qquad (1)$$

$$\beta = \sin^{-1}((n_0/n_1)\sin\beta') \qquad (2)$$

where $\alpha'$ and $\beta'$ are the incident angles of the object light and the reference light to the photosensitive member 2, respectively.

With the optical scanning device according to the invention, hologram recording is carried out continuously on the same circumferential surface of the rotary body 1 with the above-described hologram recording arrangement, to form a hologram recording medium.

In optical scanning with the hologram record medium thus formed, while the rotary body 1 is continuously rotated around its rotary shaft 3 by a drive motor (not shown), a reproducing beam B (indicated by its principal ray only) is applied in the same direction as that of the aforementioned reference light $L_R$ and around the hologram position O (the beam B being smaller than the pencil of the reference light $L_R$). As a result, a part of the object light $L_O$ at the time of hologram recording is reproduced to form an optical spot P on the scanning surface. As the rotary body 1 is rotated, the optical spot P is continuously moved on the scanning surface 4 in the main scanning direction.

It is assumed that while the rotary body 1 is driven, the rotary body 1 is inclined by an angle $\Delta\theta$ with respect to its rotary shaft because of the mechanical vibration of the rotary body 1 or the mounting error of the same. In this case, the position on the hologram to which the beam B is applied is shifted to a point $O''$, as a result of which the optical spot reproduced is shifted from the point P to a point $P'$, or by a distance $\Delta h$, in the sub-scanning direction. The relation between the values $\Delta\theta$ and $\Delta h$ is:

$$\Delta h \approx \left( r + f \cdot \frac{\cos\alpha - \cos\beta + \Delta\theta/2 \cdot \sin\beta}{\cos^3\alpha} \right) \Delta\theta \qquad (3)$$

where r is the distance between the position O where the hologram object light's principal ray is recorded and the central axis of the rotary shaft 3, and f is the distance between the position O and the scanning surface 4.

The optical scanning device according to the invention can carry out hologram recording by utilizing the relation (3) in such a manner that even if the rotary body 1 is inclined by an angle $\Delta\theta$, the hologram recording is scarcely affected and the amount of shift $\Delta h$ of the optical spot becomes zero.

In order that the value $\Delta h$ is zero at all times whatever the angle $\Delta\theta$ is, the term not related to $\Delta\theta$ in the parentheses of relation (3) should be zero. That is:

$$r + f \cdot (\cos\alpha - \cos\beta/\cos^3\alpha) = 0 \qquad (4)$$

Therefore, $$\cos\beta = \cos\alpha(1 + (r/f)\cos^2\alpha) \qquad (5)$$

Thus, if the incident angle $\alpha$ of the principal ray of the object light $L_O$ and the incident angle $\beta$ of the principal ray of the reference light $L_R$ during the hologram recording are set so that the condition (5) is satisfied, then the amount of shift of the optical spot P on the scanning surface can be minimized even when the rotary body 1 is inclined during the reproduction.

The following Table indicates the incident angles of the principal rays of the object light $L_O$ and the reference light $L_R$ which are obtained from the equation (5), with r = 50 mm and f = 500 mm:

| $\alpha$ | $\beta$ |
|---|---|
| 25.0° | 11.26° |
| 30.0° | 21.41° |
| 35.0° | 29.06° |
| 40.0° | 35.81° |
| 45.0° | 42.06° |
| 50.0° | 47.98° |
| 55.0° | 53.67° |
| 60.0° | 59.17° |

Figure 5:
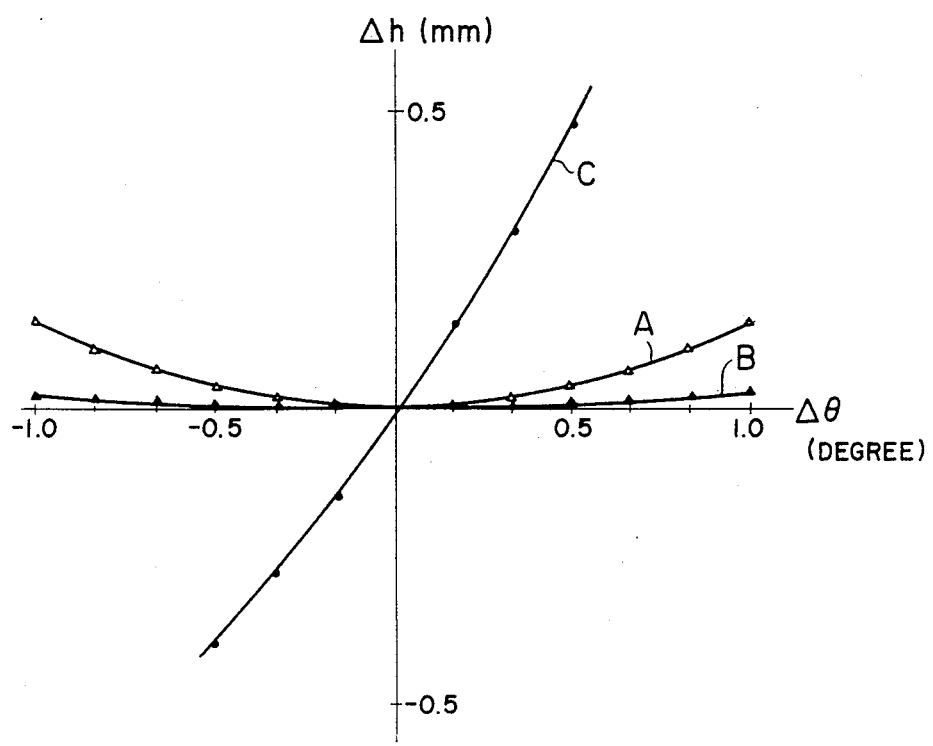
FIG. 5 is a graphical representation indicating various characteristic curves representing the shifts of the optical spot which are caused when the hologram record medium is inclined.

FIG. 5 indicates the shifts of the optical spot when the hologram record medium (the rotary body 1) is inclined in the optical scanning device according to the invention. More specifically, the curve A represents a $\Delta\theta - \Delta h$ characteristic with $\alpha = 45.0°$ and $\beta = 42.06°$ in the hologram record arrangement of r = 50 mm and f = 500 mm, and the curve B represents a $\Delta\theta - \Delta h$ characteristic with $\alpha = 25.0°$ and $\beta = 11.26°$ in the same hologram record arrangement. Further, in FIG. 5, the characteristic curve C indicates the shifts of the optical spot with $\alpha = 45.0°$ and $\beta = 45.0°$ in the prior art conducting the hologram recording with $\alpha = \beta$.

As is apparent from FIG. 5, the effect of the shift of the scanning optical spot due to the inclination of the hologram record medium in the optical scanning device of the invention is much less than that in the prior art.

While the invention has been described with reference to its preferred embodiment, it will be understood that the invention is not limited thereto or thereby. That is, instead of the conical hologram record medium, a concave or convex hologram record medium, a disc-shaped one, or a drum-shaped one may be similarly employed. In addition, instead of the light-transmissive hologram, a light-reflective hologram may be similarly employed.

As is clear from the above description, the optical scanning device according to the invention uses the hologram record medium on which a hologram is recorded with the incident angles (with respect to the hologram recording surface) of the principal rays of the object light and reference light which satisfy the equation (5) above. Therefore, even if the hologram record medium is inclined for some reasons while being rotated, the scanning optical spot is scarcely shifted, with the resultant effect that the optical scanning is carried out with high accuracy.

What is claimed is:

1. An optical scanning device comprising:
   a hologram recording medium having a photo sensitive hologram surface which is rotatable about an axis;
   a scanning surface adjacent said hologram recording medium;
   first light source means for directing a principal ray of an object light onto said hologram surface at an angle $\alpha$ with respect to a plane normal to said hologram surface; and
   second light source means for directing a principal ray of a reference light onto said hologram surface at an angle $\beta$ with respect to a plane normal to said hologram surface,
   wherein angles $\alpha$ and $\beta$ are selected such that:

$$\cos \beta = \cos \alpha (1 + (r/f) \cos^2 \alpha)$$

where:
   r = distance between said axis and said hologram surface
   f = distance between said scanning surface and said hologram surface,
   whereby a shift in the position of a spot of said principal ray of said object light on said scanning surface in response to a shift of said axis is minimized.

2. An optical scanning device as claimed in claim 1 wherein said hologram record medium is conical 1.

3. An optical scanning device as claimed in claim 1 wherein said hologram record medium is concave or convex.

4. An optical scanning device as claimed in claim 1 wherein said hologram record medium is disc-shaped.

5. An optical scanning device as claimed in claim 1 wherein said hologram record medium is drum-shaped.

6. An optical scanning device as claimed in claim 1 wherein said hologram record medium is light-transmissive.

7. An optical scanning device as claimed in claim 1 wherein said hologram record medium is light-reflective.

* * * * *